US012792733B2

(12) United States Patent
Olszak et al.

(10) Patent No.: US 12,792,733 B2
(45) Date of Patent: Nov. 10, 2026

(54) SYSTEM AND METHOD FOR ADAPTIVE DETECTION ENGINE CONFIGURATION BASED ON ENVIRONMENTAL SECURITY RANKING

(71) Applicant: Acronis International GmbH, Schaffhausen (CH)

(72) Inventors: Filip Olszak, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 147 days.

(21) Appl. No.: 18/758,283

(22) Filed: Jun. 28, 2024

(65) Prior Publication Data

US 2026/0003963 A1 Jan. 1, 2026

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC ...... G06F 21/566; G06F 21/56; G06F 21/577; G06F 21/57
See application file for complete search history.

(56) References Cited

U.S. PATENT DOCUMENTS 9,516,053 B1 * 12/2016 Muddu ................ G06V 10/225
10,938,854 B2 3/2021 Strogov et al.
11,012,449 B2 5/2021 Kostyushko et al.
11,070,570 B2 7/2021 Kostyushko et al.
11,250,126 B2 2/2022 Strogov et al.
11,586,736 B2 2/2023 Strogov et al.
11,609,988 B2 3/2023 Strogov et al.
11,836,252 B2 12/2023 Strogov et al.
11,921,850 B2 3/2024 Strogov et al.
12,323,449 B1 * 6/2025 Graves ...................... G06F 8/75
2019/0098032 A1 * 3/2019 Murphey .............. H04L 63/145
2022/0236898 A1 7/2022 Li et al.
2023/0096108 A1 3/2023 Malanov et al.
2023/0114821 A1 * 4/2023 Thomas ................ H04L 63/145 726/23

(Continued)

OTHER PUBLICATIONS

Acronis. Detection and Response, https://www.acronis.com/en-us/support/documentation/DetectionResponse/, Product Overview—Detection and Response.pdf (Dec. 17, 2021).

(Continued)

*Primary Examiner* — Zachary A. Davis
(74) *Attorney, Agent, or Firm* — ESPE Legal Consultancy FZ-LLC

(57) ABSTRACT

Systems and methods for adaptive threat detection system configuration based on advanced environmental security ranking. A method includes real-time adjustment of system components, including EDR agents, event scoring units, and event enrichment units, in response to changing threat landscapes and network environments. A method further includes retraining machine learning models, controlling thresholds, and selecting event datasets for training and testing. Additionally, a system configuration manager dynamically adjusts detection engine parameters, including correlation levels, rule-based detector settings, and the depth of analysis.

20 Claims, 7 Drawing Sheets

(56) References Cited

U.S. PATENT DOCUMENTS

2023/0205880 A1 6/2023 Ulasen et al.
2023/0396641 A1* 12/2023 Hebbagodi ......... H04L 63/1408
2025/0094585 A1 3/2025 Wuest et al.

OTHER PUBLICATIONS

Acronis. What is Endpoint Detection and Response (EDR)?, https://www.acronis.com/en-us/blog/posts/what-is-endpoint-detection-and-response-edr/, What is Endpoint Detection and Response_ _ EDR Security.pdf (Jan. 10, 2024).
Acronis. Detection and Response, https://www.arronis.com/en-us/support/documentation/DetectionResponse/, Product Overview—Detection and Response.pdf (Dec. 17, 2021).
Acronis. What is Extended Detection and Response (XDR)?, https://www.acronis.com/en-us/blog/posts/what-is-xdr/, What is XDR_ Extended Detection & Response.pdf (Apr. 15, 2024).
Acronis. EDR vs. MDR vs. XDR—What is the difference between all?, https://www.acronis.com/en-us/blog/posts/edr-mdr-xdr-everything-you-need-to-know/, What is the difference between EDR,MDR,XDR_.pdf (Jan. 7, 2024).

* cited by examiner

SYSTEM AND METHOD FOR ADAPTIVE DETECTION ENGINE CONFIGURATION BASED ON ENVIRONMENTAL SECURITY RANKING

TECHNICAL FIELD

The invention relates generally to threat detection and response. More particularly, the invention relates to systems and methods for dynamically adjusting detection parameters and configurations based on environmental scoring.

BACKGROUND

Traditional detection solutions include endpoint agents, security information and event management (SIEM) systems, endpoint detection and response (EDR) systems, and extended detection and response (XDR) systems.

Endpoint agents are deployed directly on computing devices to monitor and analyze activities for signs of malicious behavior. Endpoint agents provide real-time protection by detecting threats based on predefined rules and behavioral analysis. However, endpoint agents often operate in isolation, limiting their ability to correlate events across multiple devices and providing only a local view of security incidents.

SIEM systems aggregate and analyze security data from multiple sources within an organization environment. SIEM systems provide centralized logging, real-time monitoring, and advanced analytics to detect and respond to security incidents. While SIEM systems offer a broad perspective by integrating data from various endpoints and network devices, they have challenges in handling large volumes of data and generating actionable insights in real-time.

EDR systems enhance the capabilities of endpoint agents by providing more advanced threat detection, investigation, and response functionalities. EDR systems collect and analyze data from endpoints to identify potential threats and provide forensic information for incident response. EDR systems enable better visibility into endpoint activities in comparison with endpoint agents and support more sophisticated detection mechanisms, but EDR systems have limitations in correlating events across multiple endpoints and integrating data from non-endpoint sources.

XDR systems extend the capabilities of EDR systems by integrating data from multiple security layers, including endpoints, networks, and cloud environments. XDR systems provide a unified approach to threat detection and response by correlating events from various sources and offering a comprehensive view of security incidents. Despite the enhanced capabilities, XDR systems encounter several technical challenges that limit their effectiveness.

Traditional rule-based detection engines of detection solutions, such as EDR, XDR and SIEM, require extensive manual configuration and custom code to manage complex use cases. Manual configuration makes the detection logic difficult to maintain, test, and update. Controlling that detection rules operate as expected and measuring impact on overall system performance becomes a challenge due to the manual nature of configurations.

Traditional systems use pattern-matching algorithms to evaluate events against detection rules. Pattern-matching algorithms face performance issues due to the high volume and variety of events. Events frequently lack sufficient contextual information, necessitating external calls for additional data, which introduces delays. The inability to consistently produce optimized patterns for processing leads to performance degradation, impacting the system overall efficiency.

Machine learning-based detection engines introduce several limitations that impact their effectiveness in threat detection and response. One significant limitation is the inability to tune the solution rapidly. Machine learning (ML) models require substantial time and effort to retrain and deploy, making it challenging to adjust detection parameters quickly in response to emerging threats. Additionally, detection engines often lack granular detection control, making it difficult to determine the specific reasons behind an alert. The opaque nature of ML models means that understanding why an alert is registered necessitates a full-cycle investigation, which can be time-consuming and resource-intensive. Another limitation is that ML inference-based detection engines do not typically analyze historical data in the course of baselining, which evidences a lack of contextual understanding of long-term patterns and behaviors.

Configuring threat detection and mitigation solutions in the context of a customer environment presents additional challenges. Each network configuration, endpoint type, and user behavior require detection engines to be highly adaptable and flexible. However, the manual effort involved in configuring and maintaining detection engines for different environments can be prohibitive. Complexities often result in security solutions that are not optimally configured, reducing their effectiveness in identifying and mitigating threats.

Event operations, including event normalization, event merging and event enrichment, which standardize diverse data formats from various sources, often face challenges in adapting to specific customer environments that lead to inconsistencies and inaccuracies in threat detection. For example, event merging rules, which combine or link related events to provide a comprehensive view of potential threats that doesn't dynamically adjust to the specific event correlation requirements of different environments, leads to incomplete threat analysis and missed detection opportunities. Events that are related in one customer environment might not be recognized as related in another due to differing network architectures and operational behaviors.

Sources for event enrichment are not automatically selected and configured based on the specific environment that results in the use of irrelevant or insufficient data sources, reducing the accuracy of threat detection due to the absence of relevant context. Without relevant enrichment data, security systems fail to correctly identify the nature or severity of a threat, leading to either false positives or missed detections.

Risk assessment mechanisms of traditional solutions that do not adequately align with the specific characteristics of the customer environment, fail to consider the unique risk profiles, operational priorities, and threat landscapes of different customers, resulting in inaccurate threat severity evaluations. Such misalignment can lead to either overestimating the risk of benign activities or underestimating the risk of genuine threats, compromising the effectiveness of the security solution.

To address the technical challenges, a resource-optimized, contextual-driven, automated and configurable threat detection and mitigation solution that enhances the accuracy, efficiency, and scalability of detection engines, providing a robust defense against sophisticated security threats, is needed.

SUMMARY

Embodiments described or otherwise contemplated herein substantially meet the aforementioned needs of the industry.

In an embodiment, a method for implementing, in a computing system comprising a microprocessor and memory and storage medium, an adaptive threat detection configuration based on environmental security ranking comprises configuring an endpoint detection and response (EDR) agent, under program control of the microprocessor, to collect raw event data from an endpoint, normalize the raw event data into a standardized format, and send generic events to an event router, wherein the generic events include event fields that are common to all types of collected events; configuring the event router to receive generic events from the EDR agent, threat detection events from a detection engine, enriched events from an event enrichment unit, and event scores from an event scoring unit, and organize received event data into a persistent event stream that includes events-in-operations; training a baselining ML model to classify the events-in-operation as normal or abnormal using an event database storing historical event data and system logs, wherein a classification is an inference output comprising a normalized score of the event characterizing a probabilistic value of event deviation from a baseline and an event pattern including an event-in-operation that impacts the score; configuring the event enrichment unit to determine additional event fields and events of the event pattern for the event-in-operation type based on the baselining ML model, request enriched events from the EDR agent or event database, and write the enriched data to the persistent event stream; configuring the detection engine with detection rules using a pattern matching algorithm, wherein the detection rules are based on normalized events, enriched event fields, and event scores; wherein the pattern matching algorithm determines paths of event processing leading to threat detection; wherein each node of a path comprises operation execution of event scoring, event enrichment, event conditions check, first time window event correlation or second time window event correlation; wherein the event enrichment operation of the path is executed if the event-in-operation score exceeds a predefined threshold; wherein engine detection operations are prioritized according to event-in-operations scores; wherein a detection engine verdict is sent to the event router to the persistent event stream for further correlation; testing an adaptive threat detection system configuration and completing the configuration if the test is passed, wherein the testing comprises generating events characterizing execution of a threat from the threat collection on the endpoint and checking if all threats of the collection are registered as an incident in the detection engine; and implementing the adaptive threat detection system configuration on the computing system.

In an embodiment, a system for adaptive threat detection for a computing system configuration based on environmental security ranking comprises an endpoint detection and response (EDR) agent configured to collect raw event data from an endpoint, normalize the raw data into a standardized format, and send generic events to an event router, wherein the generic event includes event fields that are common to all types of collected events; at least one processor and memory operably coupled to the at least one processor; instructions that, when executed by the at least one processor, cause the at least one processor to implement: an event router configured to receive generic events from the EDR agent, threat detection events from a detection engine, enriched events from an event enrichment unit, and event scores from an event scoring unit, and organize received event data into a persistent event stream that includes events-in-operations, a baselining ML model trained to classify the events-in-operation as normal or abnormal using an event database storing historical event data and system logs, wherein a classification is an inference output comprising a normalized score of the event characterizing a probabilistic value of event deviation from a baseline and an event pattern including an event-in-operation that impacts the score, the event enrichment unit configured to determine additional event fields and events of the event pattern for the event-in-operation type based on the baselining ML model, request enriched events from the EDR agent or event database, and write the enriched data to the persistent event stream, the detection engine configured with detection rules using a pattern matching algorithm, wherein the detection rules are based on normalized events, enriched event fields, and event scores; wherein the pattern matching algorithm determines paths of event processing leading to threat detection; wherein each node of a path comprises operation execution of event scoring, event enrichment, event conditions check, first time window event correlation, or second time window event correlation; wherein event enrichment operation of the path is executed if the event-in-operation score exceeds a predefined threshold; wherein engine detection operations are prioritized according to event-in-operations scores; wherein detection engine verdict is sent to the event router to the persistent event stream for further correlation; and a system configuration manager configured to configure an adaptive threat detection system configuration and test the EDR agent, the event scoring unit, the event enrichment unit and the detection engine using threat collection, and complete the configuration if the test is passed, wherein testing comprises generating events characterizing execution of a threat from the threat collection on the endpoint and checking if all threats of the collection are registered as an incident in the detection engine; wherein the adaptive threat detection system configuration is implemented on the computing system.

In an embodiment, a method for adaptive threat detection system configuration in a computing system comprises configuring an EDR agent comprising collecting raw event data from an endpoint, normalizing the raw data into a standardized format, and sending generic events to an event router, wherein the generic event includes event fields that are common to all types of collected raw events; configuring the event router to receive generic events from the EDR agent, threat detection events from a detection engine, enriched events from an event enrichment unit, and event scores from an event scoring unit, and organize received event data into a persistent event stream that includes events-in-operations; training a serialized ML model, wherein the serialized ML model output comprises a normalized score of the event characterizing the probabilistic value of the relationship between an event and a threat; configuring the event enrichment unit to determine additional event fields necessary for event pattern matching of related threats, request enriched events from the EDR agent or event database, and write the enriched data to the persistent event stream; configuring the detection engine with detection rules using a pattern matching algorithm, wherein the detection rules are based on normalized events, enriched event fields, and event scores; wherein the pattern matching algorithm determines paths of event processing leading to threat detection; wherein each node of a path comprises execution of event scoring, event enrichment, event conditions check, first time window event correlation or second time window event correlation; wherein event enrichment operation of the path is executed if the event-in-operation score exceeds a predefined threshold; testing an adaptive threat detection system configuration on threat collection, and completing the configuration if the test is passed, wherein the testing comprises generating events characterizing execution of a threat from the threat collection on the endpoint and checking if all threats of the collection are registered as an incident in the detection engine; implementing the adaptive threat detection system configuration on the computing system.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

The embodiments described are exemplary ways to use the invention to solve technical problems in the field of the invention. The solutions and techniques disclosed may also be used to solve other problems in the field or to solve similar problems in other fields. Substitutions, modifications, and equivalents known to those of skill in the art may be used to implement these solutions and techniques, consistent with scope of the invention described in the claims.

DETAILED DESCRIPTION

System and methods implement adaptive threat detection system configuration to enhance the accuracy and efficiency of detecting and mitigating security threats within various computing systems and networks. Embodiments can be implemented in a staged approach. In a first stage, environmental scoring is used to assess the security context and dynamically adjust detection parameters across all system components, including configuring enrichment units to incorporate relevant contextual data, adjusting scoring unit thresholds based on real-time environmental changes, and tuning detection engine rules to respond to evolving threat landscapes. EDR agents can also be configured to adapt event processing and event normalization operations based on environmental scores and anomalous event patterns, ensuring that the entire system operates in a coordinated and efficient manner. Adaptive configuration approaches address the technical challenges of maintaining high detection accuracy while minimizing resource consumption and ensuring real-time responsiveness.

Figure 1:
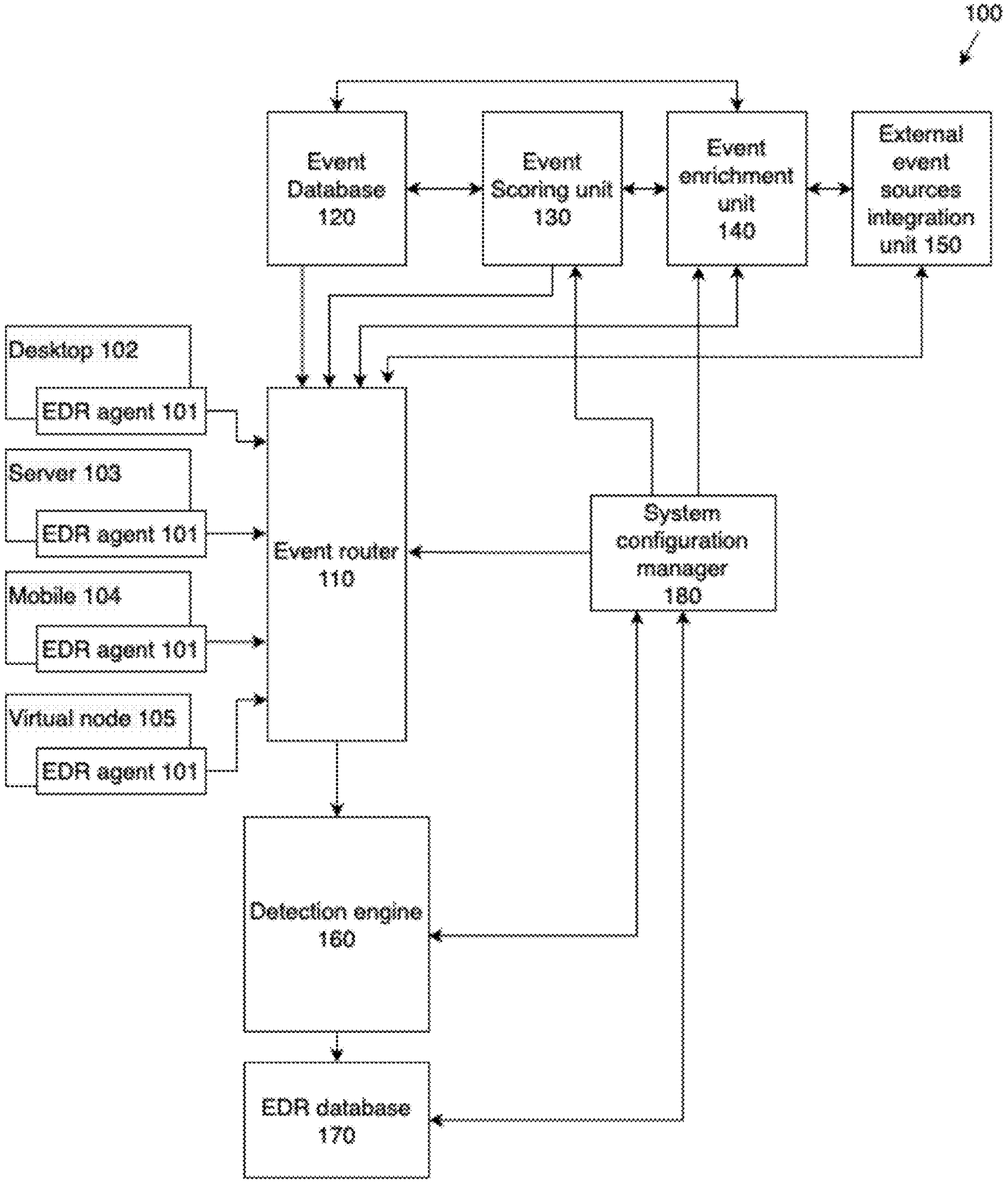
FIG. 1 is a block diagram of a system for adaptive threat detection system configuration based on environmental security ranking, in accordance with an embodiment.

FIG. 1 is a block diagram of a system 100 for event scoring and correlation for threat detection, in accordance with an embodiment. The system 100 generally comprises EDR agents 101 for data collection, an event router 110 for normalization and event routing between system units, an event scoring unit 130 for event risk assessment, referred to as event scoring, an event enrichment unit 140 for adding context to collected events, a detection engine 160 for threat analysis and system configuration manager 180 for system units configuring and control. The components are interconnected to provide a comprehensive security solution that can be automatically configured to increase detection rate and optimize computing resource consumption of managed system units. In embodiments, system 100 can include at least one processor, memory operably coupled to the at least one processor, and instructions that, when executed by the at least one processor, cause the at least one processor to execute the system 100 components described herein, including event router 110, event scoring unit 130, event enrichment unit 140, detection engine 160, system configuration manager 180, and others, as will be described with respect to system 100 (e.g. external event sources integration unit 150, etc.).

Referring to FIG. 1, system 100 comprises EDR agents 101 deployed on different types of endpoints, such as desktop 102, server 103, mobile 104, and virtual node 105. The EDR agents 101 monitor and collect raw security events from customer network endpoints and transmit the events to an event router 110. In certain embodiments, each endpoint can include its own processor and memory including instructions to execute the respective EDR agent 101. In other embodiments, EDR agent 101 can utilize other processing resources such as the at least one processor and memory of system 100 described above.

In an embodiment, EDR agents 101 can be implemented as user applications, drivers, embedded services in hardware, or containers with specific processes configured to monitor security events. In an embodiment, EDR agents 101 are lightweight and perform minimal analysis on the endpoint to detect simple threats. In an exemplary embodiment, EDR agents 101 can analyze events of a single process to detect a threat. In another exemplary embodiment, EDR agents 101 analyze endpoint events in a short-term time window to detect a threat. For example, if suspicious events are registered in the endpoint within the short-term time window, a threat is detected. Lightweight EDR agent architecture is advantageous compared to traditional security agents that often perform complex correlation and pattern-based analysis locally. Such intensive processing tasks are resource-consuming because they require significant computational power and memory to match event flow with many threat features, like behavioral patterns or correlations, which can slow down the performance of the endpoint.

In an embodiment, EDR agents 101 apply event normalization rules to generate generic events. Normalization can include structuring, parsing, and converting raw event data into a standardized format, thereby making events from different sources consistent. The normalization rules can be updated to support new event types, allowing the system 100 to adapt to evolving security needs. For example, an EDR agent 101 can capture various types of raw events such as process starts, file accesses, network connections, and registry changes. Raw events can vary in format and content depending on the source. In one embodiment, the EDR agent 101 applies predefined normalization rules to convert raw events into a standardized generic event format, including parsing the raw data to extract relevant fields, structuring the data into a consistent schema, and applying any necessary transformations to support uniformity. In other embodiments, normalization rules are defined or adapted after system implementation. By normalizing events at the endpoint, the event router 110 receives already normalized generic events, reducing the overall latency of the system 100. The normalized events are easier to enrich, score, and correlate in subsequent processing stages, improving the accuracy and effectiveness of threat detection.

In another embodiment, EDR agents 101 can also include basic event merging and filtering capabilities to reduce the volume of data transmitted to the event router. By applying simple filters, EDR agents 101 can discard irrelevant or low-priority events, ensuring that only significant events are processed further, reducing the load on the network and subsequent processing units, thereby contributing to a more scalable and efficient security system.

Event router 110 is configured for the routing of security events within the system. The event router receives generic events from EDR agents 101 and directs generic events to subsequent units for further analysis. In an embodiment, event router 110 receives threat detections from detection engine 160 and forwards it for the enrichment or for the scoring as a new generic event.

In an embodiment, event router 110 performs the task of routing the received events to the appropriate processing units, such as the event scoring unit 130, event enrichment unit 140, and detection engine 160. The event router acts as a central hub, ensuring that events are distributed to the correct components based on predefined rules and the nature of the events.

In one embodiment, event router 110 generates a persistent event flow or stack accessible by other system units for subsequent operations. A persistent event flow acts as a list of events currently in operation, allowing units such as the event scoring unit 130, event enrichment unit 140, and detection engine 160 to access, analyze, and process the events in real-time.

In an embodiment, event router 110 is implemented as a software application running on a dedicated server or as a cloud-based service. It leverages high-performance networking and computing resources to handle large volumes of security events in real-time. The event router utilizes advanced queuing and load-balancing techniques to manage event traffic efficiently and prevent bottlenecks.

In another embodiment, event router 110 can apply additional processing to the events, such as deduplication and preliminary filtering. In an embodiment, duplicated events are identified and merged, reducing the overall volume of events to be processed. Preliminary filtering can include discarding events deemed irrelevant or low-priority based on predefined criteria. Preliminary event filtering reduces the load on subsequent processing units and enhances the overall efficiency of the system.

In an embodiment, event router 110 supports scalability by distributing event processing across multiple nodes or instances. A distributed architecture allows the system 100 to handle increased event volumes and support high availability and fault tolerance. By scaling horizontally, the event router 110 can maintain optimal performance even under heavy load conditions.

In an embodiment, event router 110 is configured to be extensible, allowing for the integration of additional event sources, third-party services or additional detection engines 160, thereby extending the environmental context in operation and allowing real-time integrated event processing.

In an embodiment, event router 110 maintains a comprehensive logging and monitoring mechanism to track event flow and system performance. In an embodiment, all events received by the event router are stored in event database 120 that collects events from all EDR agents and connected 3rd party event sources. In another embodiment, selected (e.g. not all) events are stored in event database 120.

In an embodiment, event database 120 serves as the central repository for all events received by event router 110. Event database 120 is configured to store events in a structured and efficient manner, allowing quick retrieval and analysis. Event database 120 is implemented using high-performance database technologies capable of handling large volumes of data with low latency and high throughput. Examples of currently available databases that meet these criteria to varying degrees include MongoDB, Redis, Couchbase, HBase, PostgreSQL, MariaDB, MySQL, Elasticsearch, Amazon DynamoDB, and Microsoft SQL Server.

In an embodiment, event database 120 supports both short-term and long-term storage of events. Short-term storage is optimized for real-time access and quick queries, facilitating immediate analysis and response by other system components. Long-term storage retains historical event data, which can be used for retrospective analysis, ML model training, and compliance reporting. The dual storage strategy helps the system maintain high performance while also preserving valuable historical data.

In an embodiment, event database 120 provides robust indexing and querying capabilities. Events are indexed based on various attributes such as timestamp, event type, source, and event score. Event indexing facilitates efficient query execution, allowing rapid retrieval of specific events or event types for analysis. Additionally, the event database 120 supports complex queries and aggregations, allowing for advanced data analysis and reporting.

Event scoring unit 130 is configured to assess the risk level of events and/or calculate a score indicating the anomalous nature of events compared to other events with an appropriate confidence level. Event scoring unit 130 can leverage various methodologies, including ML models, statistical event counters, and historical event database views, to perform event ranking.

In an embodiment, event scoring unit 130 utilizes ML models trained on historical event data to identify patterns and anomalies. Event scoring ML models can be continuously updated with new data to improve their accuracy and relevance. For example, continuous updating can include a time-based update (e.g. daily, weekly, monthly), an event-based update (e.g. after certain ML model evaluation(s), or after certain thresholds (e.g. under 95%, 75%, 50%, or 25% identification rate). The scoring process includes analyzing the attributes of each event, such as source, type, frequency, and contextual information, to determine its risk level. The assigned score reflects the likelihood that the event represents a security threat.

In another embodiment, event scoring unit 130 can operate based on statistical event counters including maintaining counters for various event types and their attributes, which are then used to calculate the event score. For example, the event scoring unit 130 can track the frequency of certain types of events over time and compare the current event frequency to historical data. Significant deviations from the norm can indicate an anomalous event, resulting in a higher risk score.

In an embodiment, the event scoring unit 130 considers the environmental context of the events. Environmental context is derived from the collected events and enriched data, reflecting the specific conditions and activities within the monitored environment. For example, an event occurring on a high-risk endpoint or during an unusual time period receives a higher score. The context helps to differentiate between benign and potentially malicious events, thereby enhancing the accuracy of the scoring process.

In an embodiment, event enrichment unit 140 enhances the collected and normalized events by adding additional context and relevant information from various internal and external sources. Event enrichment unit 140 can provide a more comprehensive view of each event in operation, thereby improving the accuracy and effectiveness of the subsequent threat detection process.

In an embodiment, event enrichment unit 140 interfaces with internal data sources such as historical event databases and user behavior analytics systems. By correlating a current event with historical data, the event enrichment unit 140 can add contextual information such as past occurrences of similar events, associated user activities, and historical threat patterns. Event contextual information helps to differentiate between benign and potentially malicious events.

In another embodiment, event enrichment unit 140 integrates external data sources such as threat intelligence feeds, third-party security databases, and real-time alerts from external security providers. Third-party sources provide additional context on emerging threats, known attack vectors, and indicators of compromise. By operating with external data, event enrichment unit 140 can enhance the event with information about the latest security threats and vulnerabilities, thereby improving the accuracy of the risk assessment.

The enriched data added by event enrichment unit 140 includes details such as the geographic location of the event source, the reputation of the involved IP addresses, the prevalence of similar events across different environments, and the typical behavior patterns associated with the event type.

In an embodiment, the enrichment process includes both real-time enrichment of incoming events and periodic enrichment of stored events. Real-time enrichment immediately enhances event flow with the latest contextual information as they are processed by the system 100. Periodic enrichment includes updating the contextual information for stored events based on newly available data.

In an embodiment, a generic event processed at EDR agent 101, event router 110, event enrichment unit 140, and event scoring unit 130 serves as an abstraction that includes only fields common to all enriched events. For example, in the context of a Windows EDR agent, the generic event contains process information since all events (e.g., network events, file operations) can be associated with a specific process. The generic event for a Windows EDR agent includes fields such as: id: UUID; event_time: DateTime; host_name: String; agent_id: UUID; customer_uuid: UUID; customer: String; cluster_id: Integer; parent_name: String; parent_oname: String; parent_args: String; parent_path: String; parent_pid: Integer; parent_start: DateTime; parent_gpid: UUID; parent_md5: String; proc_name: String; proc_oname: String; proc_args: String; proc_path: String; proc_user: String; proc_upn: String; proc_pid: Integer; proc_start: DateTime; proc_gpid: UUID; proc_md5: String.

A specific event type, such as a network event, extends the generic event by adding fields unique to network operations, including: protocol: String; net_dst_ip: String; net_dst_port: Integer; net_src_ip: String; net_src_port: Integer; net_src_iot: Boolean; net_src_name: String; net_src_mac: String; net_src_iot_vn: String; net_src_iot_cat: String.

In an embodiment, events processed by the EDR agent 101 and sent to the event router 110 are initially in a FlatBuffer format. The FlatBuffer format is a binary buffer that contains nested objects such as structs, tables, and vectors. These objects are organized using offsets, allowing data to be traversed in place, similar to traditional pointer-based data structures. This arrangement is known as "zero-copy" deserialization, which makes accessing data in these formats much faster than data in formats requiring more extensive processing, such as JSON, CSV, and in many cases Protocol Buffers. FlatBuffer format allows optimizing data transmission by not repeatedly sending all fields for every operation. Instead, the event router 110 includes a cache component that caches repeating process information based on a unique key. Cached data is then joined with the specific event information for use in a centralized detection engine.

In another embodiment, the event enrichment unit 140 extends generic events with additional context. For example, the event enrichment unit 140 can use baselining ML models to generate enriched events with extended fields such as: enriched event context-additional metadata or threat intelligence related to the event; score parameter-risk score or anomaly score generated by the event scoring unit 130; and external event correlation-links to external events or alerts that provide further context.

Enriched events are then used by the detection engine 160 to apply correlation rules and detection algorithms. The detection engine 160 utilizes the extended context provided by enriched events and event scores to enhance threat detection accuracy. The detection engine 160 correlates the events to identify potential security threats. The detection engine 160 prioritizes the analysis based on the risk scores assigned during the event scoring stage. Detected threats are recorded in an EDR database 170 and managed by an incident manager (not shown on a FIG. 1) for appropriate response actions.

In an embodiment, event enrichment unit 140 can be implemented as a software module deployed on a dedicated server within the network infrastructure. Event enrichment unit 140 is configured for real-time data processing and integration with internal and external data sources. In another embodiment, event enrichment unit 140 can be implemented as a cloud-based service, leveraging cloud resources for scalability and high availability.

In another embodiment, event enrichment unit 140 can be deployed as a containerized application within a microservices architecture. Each container can handle specific enrichment tasks, such as fetching data from threat intelligence feeds or querying user behavior analytics systems. Microservice architecture is an architectural style for developing applications. It allows a large application to be separated into smaller independent parts, with each part having its own realm of responsibility. In a microservices architecture, each microservice is a single service built to accommodate an application feature and handle discrete tasks. Each service is a separate codebase, which can be managed by a small development team. Services can be deployed independently, meaning a team can update an existing service without rebuilding and redeploying the entire application. Services communicate with each other using well-defined APIs, and internal implementation details of each service are hidden from other services. This architecture supports polyglot programming so that different services do not necessarily require the same technology stack, libraries, or frameworks. Microservice architecture is an architectural style for developing applications. It allows a large application to be separated into smaller independent parts, with each part having its own realm of responsibility. In a microservices architecture, each microservice is a single service built to accommodate an application feature and handle discrete tasks. Each service is a separate codebase, which can be managed by a small development team. Services can be deployed independently, meaning a team can update an existing service without rebuilding and redeploying the entire application. Services communicate with each other using well-defined APIs, and internal implementation details of each service are hidden from other services. This architecture supports polyglot programming so that different services do not necessarily require the same technology stack, libraries, or frameworks. Microservice architecture of event enrichment unit 140 allows for easy scaling and maintenance, thus ensuring that the enrichment process remains efficient and up-to-date with the latest security information.

In an embodiment, event enrichment unit 140 operates with the persistent event flow provided by event router 110. Persistent event flow allows event enrichment unit 140 to continuously access and process events in real-time, ensuring that each event is enriched with the most up-to-date contextual information. By leveraging the persistent event flow, the enrichment unit can dynamically integrate data from both internal and external sources, such as historical event databases, threat intelligence feeds, and user behavior analytics systems.

In an embodiment, the system configuration manager 180 is configured to automate the configuration and optimization of various components within the adaptive threat detection system 100 based on environmental security rankings. System configuration manager 180 can be implemented as a software application running on a dedicated server, a virtual machine, or within a cloud environment. The system configuration manager 180 can also be embedded within existing infrastructure as a microservice, ensuring seamless integration with other system components.

System configuration manager 180 is configured to dynamically adjust the settings and parameters of the event enrichment unit 140, event scoring unit 130, detection engine 160, and EDR agents 101 to optimize threat detection performance in response to changing environmental contexts.

In an embodiment, the system configuration manager 180 communicates with other system components using network protocols such as HTTP, HTTPS, gRPC, or MQTT. The system configuration manager 180 sends updates and receives status information, ensuring that system components are aligned with the latest security policies and environmental contexts. In an embodiment, all system components are aligned In an embodiment, the system configuration manager 180 utilizes ML models to predict optimal configurations based on historical data and current threat landscapes. By continuously learning from new data, the system configuration manager 180 can adapt configurations in real-time, ensuring the system 100 remains effective against emerging threats.

Figure 2:
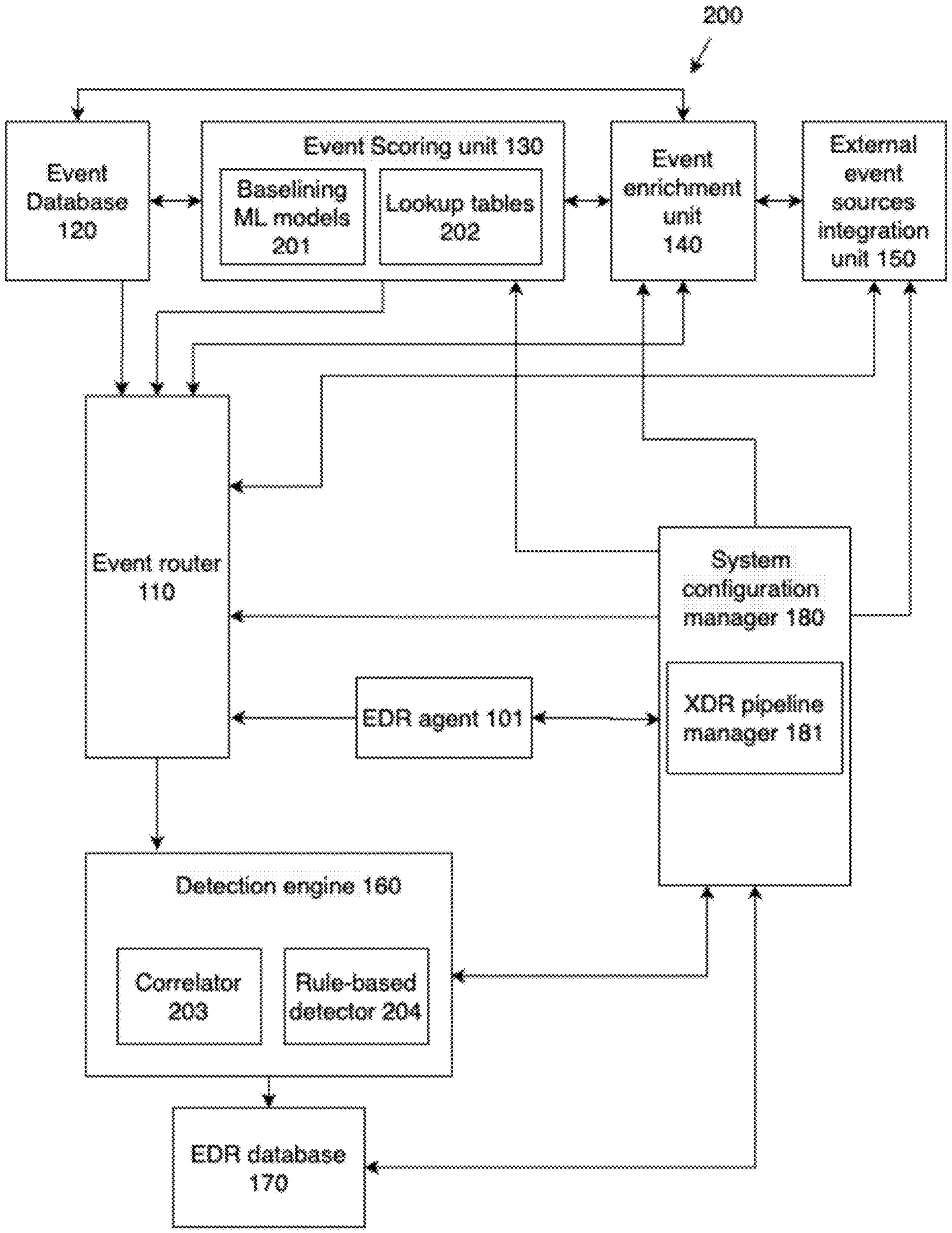
FIG. 2 is a block diagram of a system adaptive threat detection system configuration based on advanced environmental security ranking, in accordance with an embodiment.

Referring to FIG. 2, a block diagram of system 200 for adaptive threat detection system configuration based on advanced environmental security ranking is depicted, in accordance with an embodiment. FIG. 2 depicts the advanced capabilities of the event scoring unit 130, the detection engine 160, and the system configuration manager 180.

In an embodiment, event scoring unit 130 uses ML models and statistical analysis to evaluate the risk level of security events. The advanced capabilities of event scoring unit 130 include the use of baselining ML models 201 and lookup tables 202 to assess and rank the events.

In an embodiment, baselining ML models are specialized ML models configured to establish a baseline of normal behavior patterns within a network or system. Baselining ML models are specialized ML models trained using historical event data stored in event database 120. The training process includes feeding the models with datasets of historical events, allowing the models to learn and identify patterns associated with both normal and anomalous activities. The inputs to baselining ML models 201 include event attributes such as source, type, frequency, and contextual information derived from event enrichment unit 140. The outputs of baselining ML models 201 are risk scores indicating likelihood that an event represents a security threat. Examples of ML model types used to implement baselining ML models include anomaly detection models, time-series analysis models, and clustering algorithms.

In another embodiment, serialized ML models can be used instead of baselining ML models. Though baselining ML models 201 is depicted in FIG. 2, both baselining ML models and/or serialized ML models can be implemented in system 200. Serialized ML models are ML models trained, optimized, and stored in a serialized format for efficient deployment and execution. Serialized ML models are trained on the same historical events from event database 120 as baselining ML models 201. The training process includes optimizing the models for quick loading and execution, allowing the models to be stored and transmitted as compact binary files. The inputs to serialized ML models include the same event attributes as baselining ML models 201: source, type, frequency, and contextual information derived from event enrichment unit 140. The outputs of serialized ML models are also risk scores indicating the likelihood that an event represents a security threat. Examples of ML model types used to implement serialized ML models include decision trees, random forests, and gradient boosting machines.

In an embodiment, baselining ML models and serialized ML models differ primarily in their deployment and execution approaches. Baselining ML models are configured to continuously learn and adapt to changes in the system 200 by incorporating new data over time, making baselining ML models ideal for recognizing long-term trends and deviations from the norm. In contrast, serialized ML models are pre-trained, optimized for efficient deployment, and executed as compact binary files, providing immediate, on-the-fly risk assessment based on the latest trained models and threat intelligence. Serialized ML models trained to assess the score of the event-in-operation based on threat definitions to characterize the real-time security risk of the event do not need historical data for training.

In another embodiment, both types of ML models are used in event scoring unit 130. Utilizing both baselining and serialized ML models provides several technical advantages. Baselining ML models offer a deep understanding of normal behavior patterns and long-term trends, ensuring the system adapts to gradual changes in the environment. Serialized ML models provide real-time risk assessment and scoring, allowing the system 200 to respond quickly to emerging threats with the latest detection algorithms. The parallel operations of both types of ML models enhances the overall effectiveness and responsiveness of event scoring unit 130, ensuring comprehensive risk assessment and threat detection capabilities by leveraging both historical and real-time data.

In one embodiment, baselining ML models and serialized ML model 201 can run within the event enrichment unit 140. The baselining ML model 201 operates within the event enrichment unit 140 to determine which events or event fields are necessary for extending the event-in-operation data, determining additional data that is related to the event-in-operation and relevant to abnormal or risky patterns, that are a base for event-in-operation score calculation.

In one embodiment, the event enrichment unit 140 and event scoring unit 130 use the baselining ML model jointly, whether the ML model is executed within the event scoring unit, the event enrichment unit, or on a dedicated server. The baselining ML model provides a consistent framework for assessing event attributes and detecting deviations from normal behavior patterns. By using the same model, discrepancies that could arise from different models are avoided, enhancing coherence across the system, and computational resources consumption is decreased.

In an embodiment, the system configuration manager 180 dynamically adjusts the configuration parameters of each system component based on environmental security rankings. System component configuration adjustment occurs throughout the lifecycle of the system, from deployment in the customer environment to the training of ML models, detection of new threats, and incorporation of persistent threat definitions. Additionally, the system configuration manager 180 adapts to changes in the network environment, such as migrating to new operating systems, upgrading endpoints, and reconfiguring network topology. Network topology refers to the arrangement of different elements like nodes, links, and devices in a computer network. It defines how these components are connected and interact with each other.

The system configuration manager 180 ensures high-quality threat detection in dynamic environments evaluated with detection rate and false positive detections by continuously configuring and controlling the ML models of baselining, correlation, and enrichment, that is managed by the XDR pipeline manager 181, which handles model retraining, threshold control, dataset selection, and detection pipeline testing.

The XDR pipeline manager 181 handles different aspects of the adaptive configuration process. In one embodiment, XDR pipeline manager 181 prepares datasets by selecting relevant events from the event database 120, ensuring a comprehensive representation of the current threat landscape. For example, during a corporate network upgrade where new types of endpoint devices are connected to the network, the XDR pipeline manager 181 selects events related to types of new devices or excludes events for legacy devices for retraining the models.

In an embodiment, the XDR pipeline manager 181 performs various tests during training, such as cross-validation, to evaluate system 200 models performance and prevent overfitting. For instance, when there is an observed increase in a specific type of cyber attack, such as phishing, the XDR pipeline manager 181 applies cross-validation techniques to ensure the updated models accurately detect phishing attempts, adapting to new threat patterns and improving metrics like detection rate and false positive rate.

ML models ensembling can be used by XDR pipeline manager 181 to combine multiple models outputs to improve detection accuracy and robustness. In another embodiment, the XDR pipeline manager 181 employs bagging, boosting, and stacking techniques to aggregate decisions from several models. For example, if a new malware strain emerges, the XDR pipeline manager 181 can use a combination of decision trees, support vector machines, and neural networks in detection engine 160 to detect the malware more effectively. ML model ensembling allows to compensate weaknesses in one ML model of detection engine 160 with the strengths of the second ML model, thereby enhancing overall threat detection accuracy and reducing the likelihood of undetected threats.

In one embodiment, the XDR pipeline manager 181 uses supervised learning models trained on labeled event data. Supervised learning models models can include decision trees, support vector machines, and neural networks, which are trained to classify events based on their threat level. For example, in a scenario where the network topology is reconfigured, supervised learning models can be retrained using labeled events from the new topology to ensure accurate threat detection in the reconfigured network.

In another embodiment, the XDR pipeline manager 181 uses unsupervised learning models for baseline training, such as clustering algorithms, to identify anomalous patterns in the event data without predefined labels. During periods of significant changes in user behavior, such as a shift to remote work, unsupervised learning models can detect new patterns of legitimate activity and distinguish them from potential threats.

In yet another embodiment, the XDR pipeline manager 181 uses semi-supervised learning, leveraging both labeled and unlabeled data to enhance model accuracy. Active learning techniques can be applied, where the ML model queries a human expert for labels on uncertain events, thereby improving the training dataset iteratively. For example, when new applications are deployed on endpoints, semi-supervised models can learn to distinguish between normal and anomalous behavior of new applications more effectively, improving overall threat detection performance.

By continuously monitoring the environment and retraining models based on new data, the XDR pipeline manager 181 ensures the detection pipeline adapts to emerging threats and changes in the network environment. Dynamic approach maintains the effectiveness and accuracy of the threat detection system, providing robust security in diverse and evolving contexts.

In an embodiment, the system configuration manager 180 dynamically adjusts various parameters of the EDR agent 101 based on environmental changes.

In one embodiment, when new types of threats are identified or the threat landscape evolves, that is characterized with registered specific events, written by an external event source in persistent event stream of event router 110, the system configuration manager 180 updates the detection rules to include new signatures and behavioral patterns in EDR agent. For example, a registered specific event could be a network anomaly detected by an external network security appliance. Suppose the external event source identifies an unusual increase in outbound traffic to a known malicious IP address, which is then logged into the persistent event stream. In response to this event, the system configuration manager 180 updates the detection rules in the EDR agent to include a new signature that flags any outbound connections to the malicious IP address as suspicious. The update can also incorporate a behavioral pattern that monitors for repeated connection attempts to various IP addresses in a short period, indicating potential command-and-control (C2) server communication attempts. The system configuration manager 180 adjusts the event filtering criteria to prioritize high-scored events and refines the whitelisting and blacklisting settings accordingly. Automated response scripts are updated by the system configuration manager 180 to address new threat vectors or high-scored detections of detection engine 160.

During periods of high system load or to optimize performance, the system configuration manager 180 adjusts the data collection settings of the EDR agent 101, reducing the frequency of data collection or focusing on specific types of events that are more critical in terms of event scoring. System configuration manager 180 performs regular health checks to ensure the EDR agent 101 is functioning optimally and collects telemetry data to analyze performance trends. For example, if a certain type of event consistently scores low in terms of event scoring, EDR agent event collection frequency can be reduced to conserve resources. If a high-severity event or engine detection is registered in the persistent event stream by the event router 110, the system configuration manager 180 can increase the granularity and frequency of data collection for that event type to ensure thorough monitoring.

When there is a need to enhance detection capabilities, such as identifying more sophisticated threats, the system configuration manager 180 updates the event collection rules of EDR agent to ensure all relevant data is collected initially within the scope of generic events. The system configuration manager 180 defines custom fields for specific event types that enhance threat analysis from detection rate perspective. In an embodiment, if a particular type of event is critical from retrospective incident analysis or baselining model training, the system configuration manager 180 extends the generic event data format to include mandatory fields from the event enrichment unit 140.

In an embodiment, the system configuration manager 180 dynamically adjusts various parameters of the event scoring unit 130 to ensure the event scoring unit 130 remains effective in evaluating the risk levels of events based on changing environmental conditions. The event scoring unit 130 includes configurable parameters such as thresholds for risk levels, weights for different event attributes, update frequencies for lookup tables, and sensitivity settings for baselining ML models. Event scoring unit 130 configurations allow the event scoring unit 139 to adapt to new threats, detection engine verdicts, and incident reports.

In one embodiment, when new threat definitions are introduced, the system configuration manager 180 updates the thresholds and weights used by the event scoring unit 130. For example, if a new type of malware is identified and added to the threat database, the system configuration manager 180 adjusts the scoring parameters to assign higher risk levels to events associated with the characteristics of the threat.

In an embodiment, the system configuration manager 180 modifies the sensitivity settings of the event scoring unit in response to detection engine verdicts. If the detection engine 160 identifies a pattern of false positives or missed detections, the system configuration manager 180 can fine-tune the scoring algorithms to improve accuracy. For instance, if a particular type of event is frequently misclassified, the manager adjusts the scoring criteria to better distinguish between benign and malicious activities.

In another embodiment, when an incident occurs and a retrospective analysis reveals that certain events were not properly weighted or considered, the system configuration manager 180 updates the lookup tables within the event scoring unit 130. Lookup tables updating includes recalculating the statistical significance of various event attributes and adjusting the lookup tables to reflect the new insights. By doing so, the system configuration manager 180 ensures that similar incidents are detected more accurately in the future. In one embodiment, the system configuration manager 180 adjusts at least one lookup table with cached event scores, event statistics, event fields statistics, and event pattern statistics. Adjusted lookup tables are utilized by the event scoring unit 130 and the event enrichment unit 140 to retrieve the score of an event-in-operation and determine relevant event data for enrichment without the need to inference the baselining ML model or serialized ML models.

In an embodiment, the system configuration manager 180 adapts the update frequency of the lookup tables generation or update based on the dynamic nature of the environment. For example, during periods of heightened threat activity, such as a widespread cyber attack, the system configuration manager 180 increases the frequency of updates to the lookup tables to ensure that the most current data is used for event scoring. Conversely, during periods of stability, the system configuration manager 180 can reduce the frequency of updates to conserve resources. Additionally, the system configuration manager 180 integrates feedback from security analysts and automated threat intelligence sources to continually refine the event scoring unit parameters.

In an embodiment, the system configuration manager 180 dynamically adjusts parameters of the event enrichment unit 140 to ensure the event enrichment unit 140 remains effective in enhancing the context and detail of events based on changing environmental conditions. The event enrichment unit 140 includes configurable parameters such as data sources for enrichment, enrichment frequency, the types of event fields to enrich, and prioritization criteria for different event types.

In an embodiment, when new threat definitions are introduced, the system configuration manager 180 updates the data sources used by the event enrichment unit 140. For example, if a new threat intelligence feed becomes available that provides critical information on emerging threats, the system configuration manager 180 integrates the threat intelligence feed into the enrichment process.

In another embodiment, when an incident occurs and retrospective analysis reveals gaps in the event data, the system configuration manager 180 updates the types of event fields to enrich. For example, if a security breach analysis shows that certain registry changes or process interactions were not adequately captured, the system configuration manager 180 adjusts the enrichment rules to include additional fields for related generic events.

In yet another embodiment, the system configuration manager 180 adapts the prioritization criteria for enrichment based on the dynamic nature of the environment. During periods of heightened threat activity, the system configuration manager 180 can prioritize enrichment for high-risk events identified by the event scoring unit 130. For example, if the event scoring unit 130 assigns a high risk score to a series of suspicious login attempts, the event enrichment unit 140 can be configured to prioritize additional data collection for login related events, providing deeper context for the detection engine 160.

In an embodiment, the system configuration manager 180 dynamically adjusts parameters of the detection engine 160 to ensure the detection engine 160 remains effective in correlating events and detecting security threats based on changing environmental conditions. The detection engine 160 includes configurable parameters such as correlation parameters, rule-based detector parameters, detection engine tasks queue, depth of analysis (such as correlation levels), time window width for event correlation, and severity levels for engine detections.

In one embodiment, when new threat definitions are introduced due to the identification of emerging threats, the system configuration manager 180 updates the correlation parameters of the detection engine 160. For example, if a new type of attack pattern involving multiple stages is registered in an incident or in a third-party event source (e.g. as indicated by external event sources integration unit 150), the system configuration manager 180 updates the correlation rules to link seemingly unrelated events that occur over different endpoints.

In an embodiment, when an event or event pattern is detected in the persistent event stream at the event router 110 followed by the incident registration for multiple endpoints, the system configuration manager 180 reconfigures the detection engine 160 to prioritize and focus on event types of event or event patterns.

In an embodiment, the system configuration manager 180 modifies the rule-based detector parameters in response to changes detected by the event enrichment unit 140. If the event enrichment unit 140 is unable to complete event enrichment, indicating potential data insufficiency, the system configuration manager 180 can adjust the detection rules to compensate by enhancing the specificity and comprehensiveness of the rule-based detectors. Additionally, conditions in the lookup tables and baselining inferences can trigger adjustments to the detection engine 160, ensuring that the correlation and detection processes remain aligned with the most current data and threat intelligence.

In another embodiment, the system configuration manager 180 configures the detection engine tasks to align with the organization security policies and operational priorities. For example, if certain types of events are deemed critical based on their score or enrichment status, the system configuration manager 180 can prioritize detection engine 160 tasks that focus on high-priority event types, ensuring that the most significant threats are addressed promptly.

In an embodiment, the depth of analysis performed by the detection engine 160, such as the number of correlation levels, is dynamically adjustable. For example, if the event scoring unit 130 assigns high risk scores to a series of events resulting in registering incidents of advanced persistent threat (APT), the system configuration manager 180 can increase the depth of analysis to include multiple correlation levels, linking various related events to identify the APT more effectively.

In an embodiment, the system configuration manager 180 adjusts the time window for event correlation based on detection requirements and environmental context. For instance, during periods of high threat activity, extended time windows for correlations are established or updated. Conversely, during less volatile periods, the time windows can be shortened optimizing resource consumption.

In one embodiment, the detection engine 160 is configured and trained in relation to event normalization, event scoring, and event enrichment processes. The integration of event scoring and event enrichment into detection engine 160 data for analysis ensures that detection engine rules and correlator ML models are aligned with the environmental state of the protected endpoints and networks. The detection engine 160 is integrated with system units at the level of the event data structure. The integration is achieved by ensuring that the event data fields used by the detection engine are consistent with event data fields used by the event router 110, event scoring unit 130, and event enrichment unit 140. The normalized events include standardized fields that capture valuable attributes used by the detection engine 160 and exclude fields that do not affect detection rate. Detection engine rules and models are based on the event scores of both generic events and enriched events, ensuring that the threat analysis takes into account the most comprehensive and contextual information available. The seamless flow of standardized event data across system components will be described in further detail.

Figure 3A:
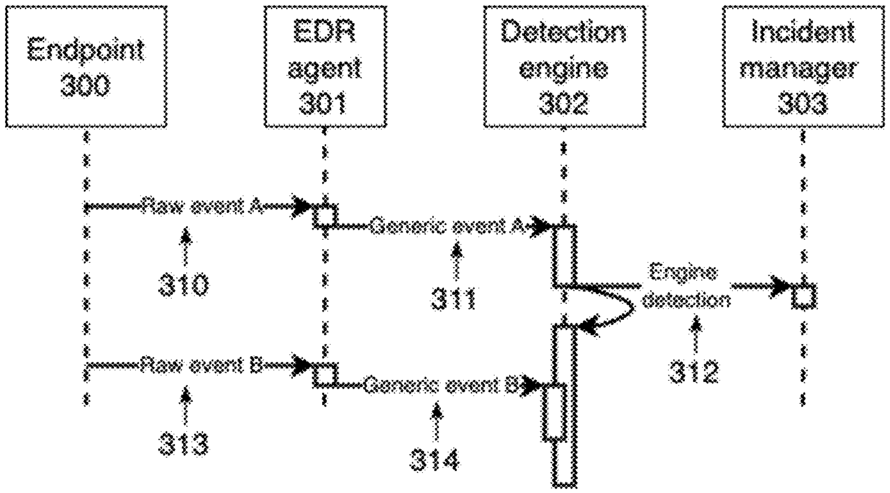
FIG. 3A is a data flow diagram of a threat detection system, in accordance with an embodiment.

Referring to FIG. 3A, a data flow diagram of a threat detection system is depicted, in accordance with an embodiment.

In an embodiment, the system includes an endpoint 300, an EDR agent 301, a detection engine 302, and an incident manager 303. The data flow begins at endpoint 300, where raw security events are generated. Raw events, such as raw event A 310 and raw event B 313, are detected and collected by EDR agent 301. The EDR agent 301 normalizes raw events into generic events, represented as generic event A 311 and generic event B 314.

The generic events are then forwarded to detection engine 302. Within detection engine 302, generic events are analyzed against predefined security rules to identify suspicious patterns and activities. For example, detection engine 302 processes generic event A 311 and generates a detection of a threat 312, referred to as engine detection or detection, if a threat is identified. Similarly, generic event B 314 is processed, and if deemed suspicious, another detection of a threat is generated at detection engine 302. In the depicted data flow, generic event B 314 is not assessed as suspicious, and another engine detection is not registered. In an embodiment, generated engine detections can be related to a one type of threat. In another embodiment, generated engine detections can be related to different types of threats. System, shown on a FIG. 3A doesn't include a correlator that can combine event A 311, event B 314 and threat detections, including engine detection 312, into a single incident.

The generated detection 312 is sent to incident manager 303, which is configured for handling the security incidents. Incident manager 303 coordinates the response actions based on the detected threats, ensuring appropriate measures are taken to mitigate potential risks.

In an embodiment, the detections, such as engine detection 312, are stateless, meaning that the detection engine 302 does not retain any context or state information about the events in course or after processing. Consequently, if a detection 312 related to event A is identified, it is not further corrected or re-evaluated in the case of a possible false positive. In contrast to traditional approaches, which can lead to inefficiencies in threat detection and response, embodiments described herein can dynamically reassess and refine detections based on additional context or data, according to an embodiment.

Figure 3B:
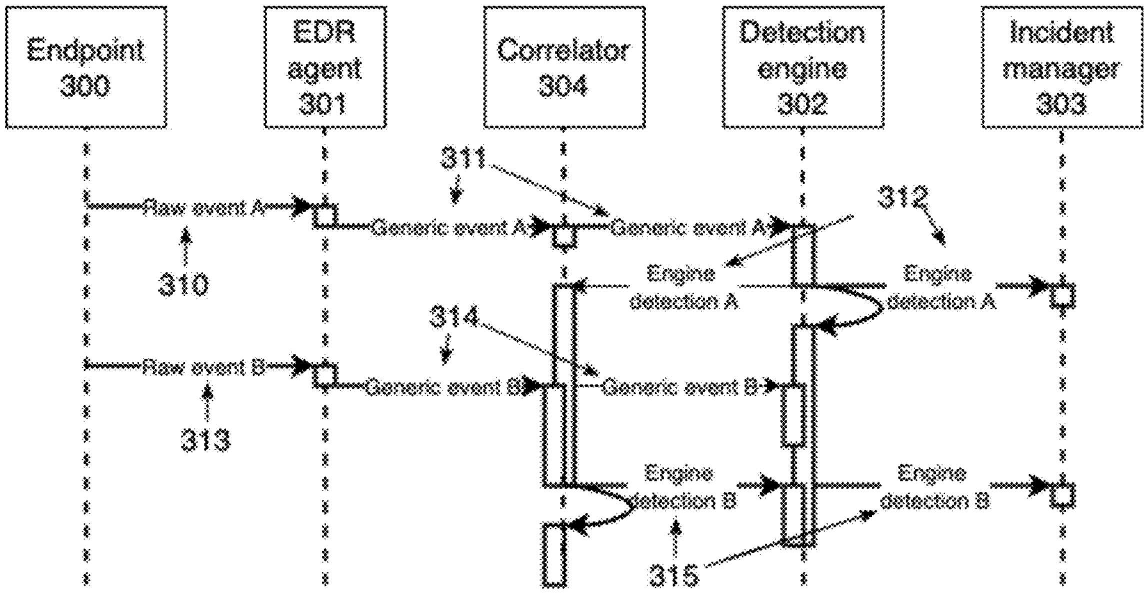
FIG. 3B is a data flow diagram of a threat detection system with event correlation, in accordance with an embodiment.

Referring to FIG. 3B, a data flow diagram of a threat detection system with event correlation is depicted, in accordance with an embodiment. FIG. 3B depicts how engine detections are correlated with subsequent events to improve threat detection accuracy.

In an embodiment, the system includes an endpoint 300, an EDR agent 301, a correlator 304, a detection engine 302, and an incident manager 303. The data flow begins at endpoint 300, where raw security events are generated. Raw events, such as raw event A 310 and raw event B 313, are detected and collected by EDR agent 301. The EDR agent 301 normalizes raw events 310, 313 into generic events, represented as generic event A 311 and generic event B 314.

The generic events 311, 314 are then forwarded to detection engine 302. Within detection engine 302, ranked and enriched events are analyzed to identify suspicious patterns and activities. For example, detection engine 302 processes generic event A 311 and generates a detection A 312 if a threat is identified. Initial detection 312 is then sent to correlator 304.

Correlator 304 retains context and state information about the detections and continuously monitors for subsequent events related to context. When generic event B 314 is detected by EDR agent 301 and forwarded to detection engine 302, it generates another detection, detection B 315. Correlator 304 then correlates detection A 312 with the new detection, detection B 315, to determine if there is a relationship between them.

The correlation process includes comparing the attributes and context of the engine detections to identify patterns or sequences indicating a more significant threat. A correlation stage enhances detection quality by leveraging the context provided by multiple related events. For example, if detection A 312 is a suspicious file access and detection B 315 is a related network connection, correlator 304 identifies the combined activity as a coordinated attack, enhancing the detection accuracy. The results of the correlated detections are then sent to incident manager 303, which coordinates the response actions based on the correlated threats and provides a context of related events being a cause of the registered incident.

Figure 3C:
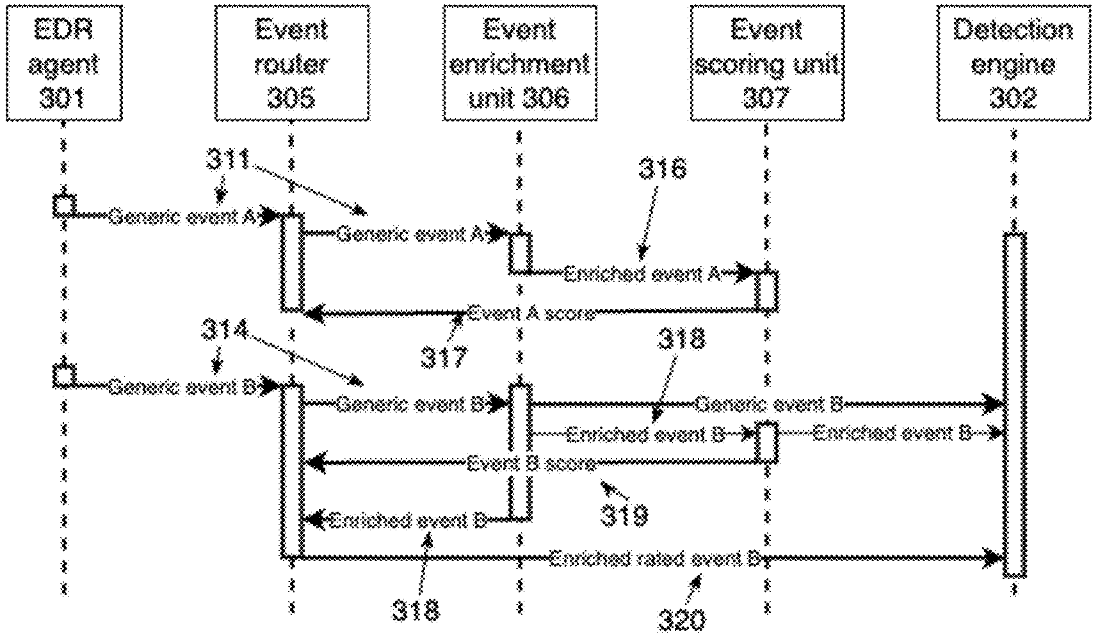
FIG. 3C is a data flow diagram of a threat detection system with advanced environmental ranking, in accordance with an embodiment.

Referring to FIG. 3C, a data flow diagram of a threat detection system with advanced event scoring is depicted, in accordance with an embodiment. FIG. 3C shows how the system 200 incorporates event scoring and enrichment to enhance threat detection accuracy.

In an embodiment, the system includes an EDR agent 301, an event router 305, an event enrichment unit 306, an event scoring unit 307, a detection engine 302, and an incident manager 303. The data flow begins at EDR agent 301, where raw events, such as raw event A 310 and raw event B 313, are detected and collected by EDR agent 301. The EDR agent 301 normalizes raw events into generic events, represented as generic event A 311 and generic event B 314. The generic events 311, 314 are forwarded to event router 305. Event router 305 directs events to both the event enrichment unit 306 and the event scoring unit 307. Generic event A 311 is sent to event enrichment unit 306, where it is enriched with additional context, resulting in enriched event A 316. Simultaneously, generic event A 311 is sent to event scoring unit 307, which assigns a score to the event based on its risk level. The score, referred to as event A score 317, indicates the likelihood that the event represents a security threat. If event A score 317 is below a predefined threshold, event router 305 filters the event, and the event is not forwarded for further analysis by detection engine 302 and enriched scored event A 318 is filtered out due to a low score.

Generic event B 314 undergoes a similar process of enrichment and scoring, resulting in enriched event B 319 and event B score 318. If the score of event B 318 exceeds the threshold, the enriched scored event B 320 is sent to detection engine 302 for further analysis. Detection engine 302 processes enriched scored event B 320 by applying predefined security rules and correlating it with other events to detect potential threats.

The correlation process within detection engine 302 involves multi-stage analysis, where the initial detection of generic event B 314 is correlated with enriched event B 319, the final enriched scored event B 320. The final detection results are sent to incident manager 303.

Figure 4:
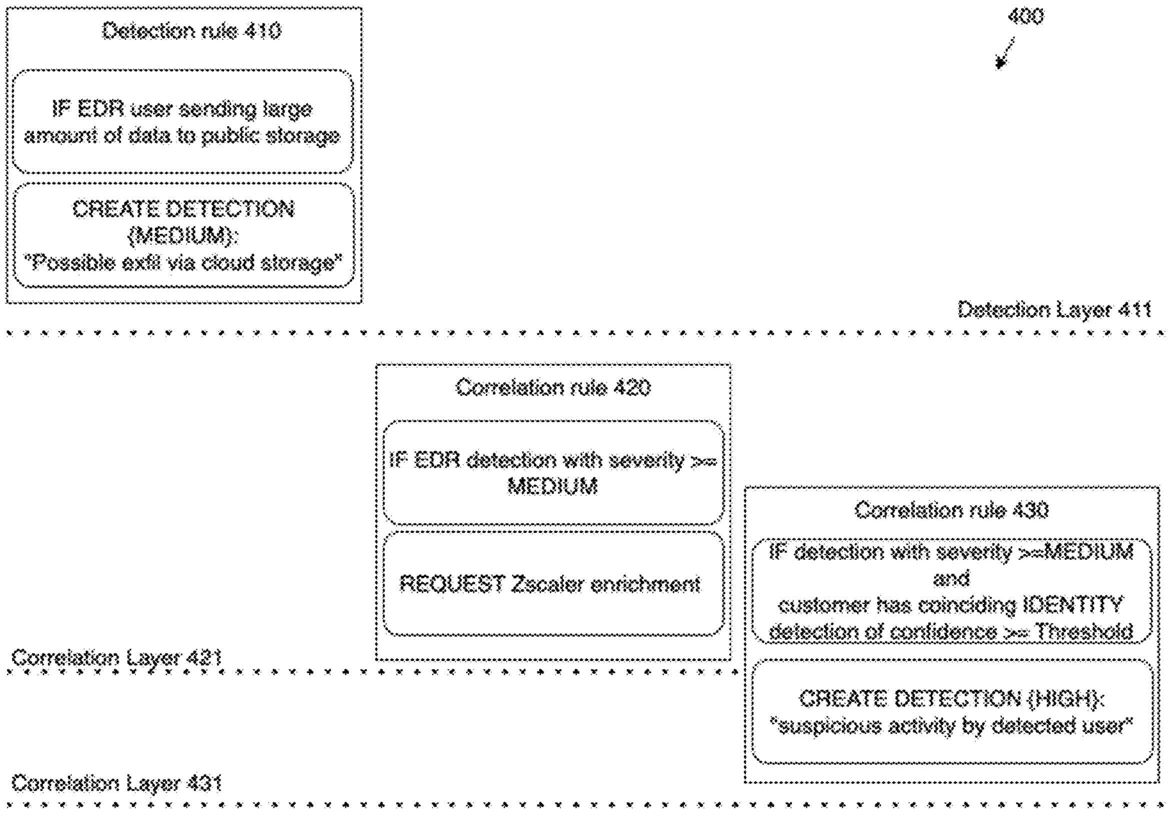
FIG. 4 is a workflow diagram of a threat detection engine based on event correlation, in accordance with an embodiment.

Referring to FIG. 4, a workflow diagram 400 of a threat detection engine based on event correlation is depicted, in accordance with an embodiment. FIG. 4 illustrates the stages of detection and correlation to produce increasingly relevant detections through extended event analysis. Detection rule 410 at detection layer 411 specifies that if an EDR user is sending a large amount of data to public storage, the system creates a medium-severity detection labeled "possible exfil via cloud storage."

Correlation layer 421 employs correlation rule 420, which specifies that if an EDR detection with a severity level of medium or higher is identified, the system requests enrichment from a third-party service, such as Zscaler. Correlation layer 421 refines the initial detection by integrating external threat intelligence, enhancing the context and accuracy of the detection.

Further, correlation layer 431 utilizes correlation rule 430, which specifies that if a detection with a severity level of medium or higher with an identity detection of confidence exceeding a certain threshold, the system creates a high-severity detection labeled "suspicious activity by detected user." Implementing a multi-staged approach ensures that the detection engine continuously refines detection assessments, correlating generic events, event scores and engine detections of previous stages within the long-term window.

Figure 5:
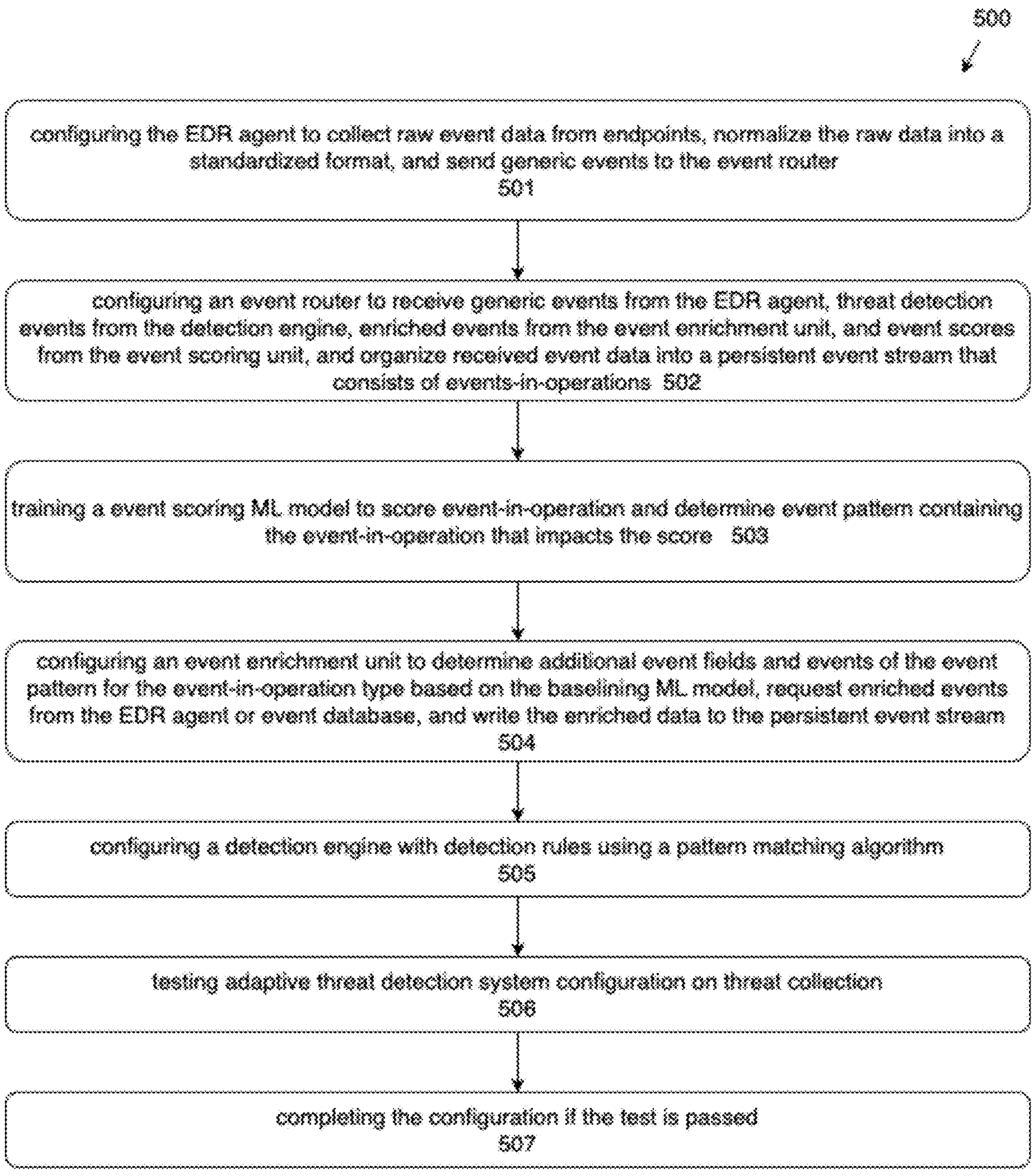
FIG. 5 is a flowchart of a method for adaptive threat detection system configuration based on environmental security ranking, in accordance with an embodiment.

Referring to FIG. 5, a flowchart of a method 500 for adaptive threat detection system configuration based on environmental security ranking is depicted, in accordance with an embodiment. The method includes configuring various system components at a system configuration unit (e.g. system configuration manager 180) to ensure an effective and adaptive threat detection system operation.

Method 500 includes, at 501, configuring the EDR agent including setting parameters and conditions to enable the EDR agent to collect raw event data from endpoints, normalize the raw data into a standardized format, and send generic events to the event router. In an embodiment, the configuration process can include at least one of uploading configuration files to the EDR agent, adjusting data collection parameters, specifying normalization rules, and defining the event fields that should be included in the generic events.

Method 500 includes, at 502, configuring an event router to receive generic events from the EDR agent, threat detection events from the detection engine, enriched events from the event enrichment unit, and event scores from the event scoring unit, and organizing received event data into a persistent event stream that includes events-in-operations. The configuration settings define how events are categorized into different streams based on event type or score. In an embodiment, event router configuration can be implemented by uploading configuration files or updating specific programming modules within the event router.

Method 500 includes, at 503, training event scoring ML model to score event-in-operation. In an embodiment, if the event scoring ML model is the baselining ML model, a system configuration manager performs a training of baselining ML model to classify events-in-operation as normal or abnormal using an event database storing historical event data and system logs. The inference output comprises a normalized score of the event characterizing the probabilistic value of event deviation from the baseline and an event pattern containing the event-in-operation that impacts the score. Configuration includes defining the training dataset, setting training parameters, and determining the criteria for classifying events. Training can include uploading historical data and selecting appropriate machine learning algorithms.

Method 500 includes, at 504, configuring an event enrichment unit to determine additional event fields and events of the event pattern for the event-in-operation type based on the baselining ML model, request enriched events from the EDR agent or event database, and write the enriched data to the persistent event stream. Configuration adjustments can be made by uploading configuration files or updating specific programming modules of the event enrichment unit.

Method 500 includes, at 505, configuring the detection engine including setting parameters and conditions to form the detection engine with specific features and limitations. The detection engine is configured in accordance with a pattern matching algorithm that determines paths of event processing leading to threat detection. Each node of paths of the algorithmic trees comprises operations such as event scoring, event enrichment, event conditions check, event short-term time window correlation, or event long-term time window correlation.

In one embodiment, a short-term time window is a defined period during which security events are analyzed for immediate threat detection. The short-term time window is limited by the common duration of suspicious operations performed by malware, typically ranging from seconds to a few minutes. The short-term time window can also be defined according to the amount of operational memory available for analyzing security events in cache, ensuring efficient processing and rapid detection of threats.

In another embodiment, a long-term time window, referred to as a second time window, spans a more extended period, reflecting the average duration over which attacks or security incidents may unfold. The long-term time window can range from hours to days or even longer, allowing the system to correlate events over a prolonged time frame. The long-term time window can be defined according to an average period of attacks or incidents thereby allowing for identification of complex, persistent threats.

In an embodiment, detection engine configuration includes defining detection rules that the detection engine will apply to process events. Configuration includes setting up the pattern matching algorithm to identify and create paths based on event scores and conditions. Thresholds for event enrichment are defined to ensure that the enrichment operation is executed only if the event-in-operation score exceeds a predefined threshold. Detection operations are prioritized based on event-in-operation scores to ensure high-risk events are processed first. The detection engine is configured to send its verdicts to the event router, where they are written to the persistent event stream for further correlation.

Method 500 includes, at 506, testing an adaptive threat detection system configuration on a threat collection. The system configuration manager sets up the testing stage, which includes generating events that simulate known threats on endpoints and verifying that simulated threats are accurately registered as incidents by the detection engine.

Method 500 includes at 507, the configuration being completed if the test at 506 is passed. In various embodiments, configuration adjustments are triggered on specific environmental changes, such as network topology alterations, the introduction of new endpoint devices, updates to threat intelligence data, hardware or software upgrades, changes in user behavior patterns, or the detection of active threats. Configuration adjustments can include extending event fields, increasing event scores, retraining baselining ML models, or changing time window values for event correlations.

Figure 6A:
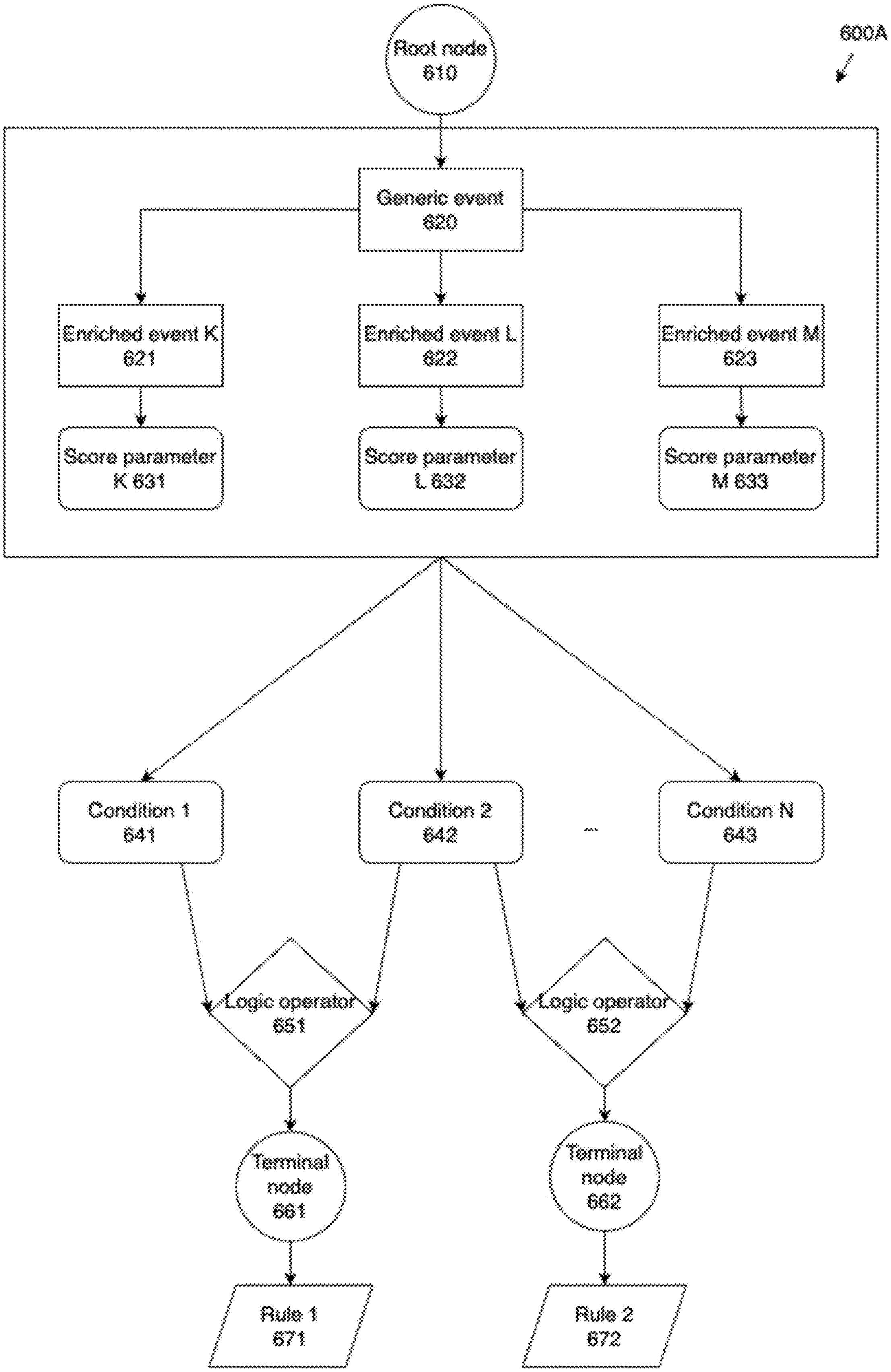
FIG. 6A is a block diagram of a threat detection engine rule composition based on a Rete network algorithm, in accordance with an embodiment.

Referring to FIG. 6A, a block diagram of a threat detection engine rule composition based on a Rete network algorithm is depicted, in accordance with an embodiment. The Rete algorithm optimizes the matching of patterns and rules within the detection engine by constructing a network of nodes, where each node represents a condition or event pattern processing, including checks, event scoring, event enrichment, event correlation. The algorithm processes events through network nodes to efficiently compose detection rules, significantly enhancing the performance of the rule-matching process in system embodiments, such as system 200.

The Rete algorithm operates by creating a network that retains intermediate results, thus avoiding redundant evaluations of the same event conditions. When an event enters the system, it propagates through the network, triggering nodes that represent matched conditions. Network structure of event processing allows real-time processing of large volumes of data, maintaining efficiency even as the number of rules increases.

In one embodiment, the root node 610 serves as the entry point for all events processed by the detection engine. The generic event 620 is the initial representation of an event entering the system. Generic event 620 is then processed through various pathways depending on generic event fields or attributes. For instance, enriched event K 621, enriched event L 622, and enriched event M 623 represent events that have been enriched with additional environmental contextual information produced at the event enrichment unit 140. Each enriched event is associated with a score parameter (score parameter K 631, score parameter L 632, score parameter M 633), which quantifies the risk or relevance of the event, produced at the event scoring unit 130. Enrichment thereby, in terms of the Rete network, reduces the load on correlation operations and decreases the number of network nodes, helping to get event data that is significant for the threat at initial stages, which aids in quickly excluding false positives and preventing redundant operations.

In an embodiment, the Rete network does not apply any score values directly in score parameters node 631-633, but instead adds a check of whether the event score is above or below a predefined threshold. In another embodiment, the threshold is defined and also updated. Scoring, score thresholds, and statistical event matching that determines relevant events and event data for an event-in-operation are generated and configured in the baselining ML model. When the detection logic described in a view of Rete network will be composed, the score of events will be loaded from the lookup tables or from the event scoring ML models as parameters. With applied parameters of baselining event scores, or average event score, that characterize an event score threshold, the detection engine 160 performs threat analysis in stateful mode, without the need to change the composed detection logic, including conditions and logic operators.

Conditions, such as condition 1 641, condition 2 642, and condition N 643, are determined during the correlation ML model training based on expert data or labeled training datasets, including security incidents and related event patterns. Conditions 641, 642, 643 are evaluated using logic operators (logic operator 651, logic operator 652), leading to terminal nodes (terminal node 661, terminal node 662). Each network path of the Rete network represents a resulting detection rule (rule 1 671, rule 2 672).

According to an embodiment, the detection engine rules and correlator ML models are based on event scores of generic events and enriched events, leveraging the detailed event data structure to enhance the accuracy of threat detection. The integration of event scoring and enrichment into the detection engine 160 ensures that the detection engine 160 operates with a comprehensive understanding of environmental security ranking and context, thereby combining stateless and stateful threat analysis.

In one embodiment, the system 200 is configured such that adjustments to the detection engine configuration do not necessitate retraining the event scoring ML model, and retraining of the event scoring ML model does not require detection engine configuration adjustment. The detection engine 160 operates independently of the event scoring ML model, including the baselining ML model. In this embodiment, the detection engine 160 uses pattern matching algorithms and predefined rules to analyze normalized events, enriched event fields, and event scores, without relying on the baselining ML model for its operation.

Figure 6B:
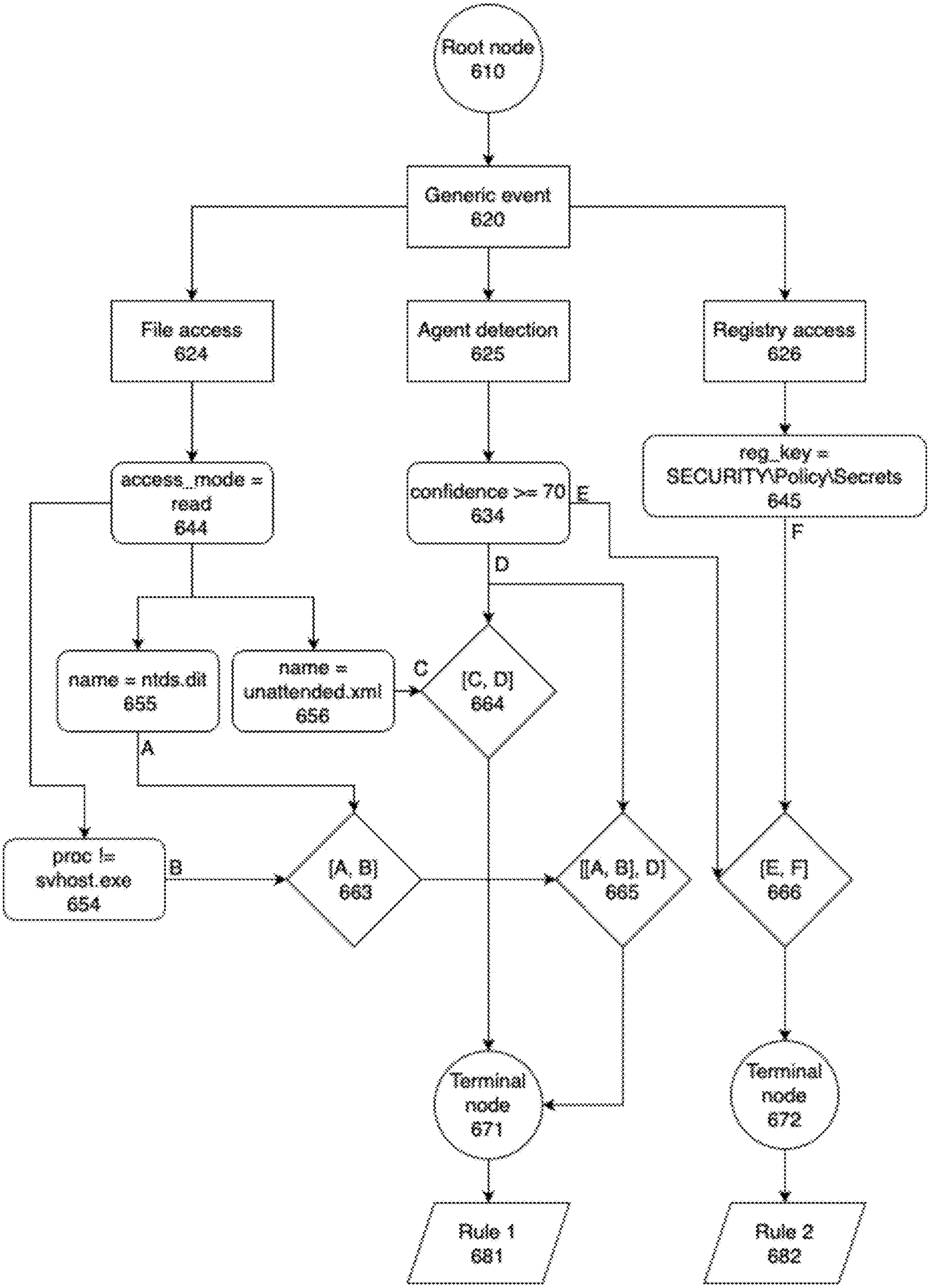
FIG. 6B is a Rete network diagram of two detection engine rules, in accordance with an embodiment.

In the method of configuring the network, historical data of the network and security incidents that were registered in response to event pattern detection, plus stateless predefined rules, are mapped on the Rete network. All conditions and checks are integrated in a unified context-specific threat detection algorithm. Threat definitions and incidents represent terminal nodes and raw events represent the root node. The purpose of training or configuring is to build an optimized Rete network that processes events efficiently. This optimization is achieved by avoiding duplication of event checks and filtering secure or normal events using score-based filtering. Checks are performed in a prioritized manner, including enrichment steps. These enrichment steps can involve on-demand requests to third-party event sources and feeds, as well as extending events with additional data from endpoints. Event correlation is prioritized for the nodes identified as risky. Thus, the threat detection system optimizes calculations and dynamically adjusts detection logic integrated with environmental ranking, according to an embodiment.Referring to FIG. 6B, a Rete network diagram of two detection engine rules is depicted, in accordance with an embodiment. FIG. 6B illustrates the evaluation logic of two detection rules using the Rete algorithm. More particularly, FIG. 6B illustrates the process of analyzing a generic event, followed by the evaluation of related enriched events, and the subsequent condition checks, logic operations, and threat detection stages. The "rule 1" 681 and "rule 2" 682 can be represented in markup language as:

```
  rule 1:
  WinAgentDetection(confidence >= 70)
  WinFileAccess( access__mode = read, name = "Unattended.xml" ||
  (name = "ntds.dit" &&
proc != "svchost.exe") )
  rule 2:
  WinAgentDetection(confidence >= 70)
  WinRegAccess( reg__key str[endsWith] "SECURITY\\Policy\\Secrets" )
```

The root node 610 represents the entry point of the generic event 620 into the detection engine. The generic event 620 is analyzed for specific event types: file access 624, agent detection 625, and registry access 626, that are provided by the event enrichment unit 140.

When the generic event 620 indicates a file access 624, the system checks the access mode 644. If the access mode equals "read," the event proceeds to the next conditions. First, it checks if the process name is not "svhost.exe" and proceeds to path A. In parallel, the condition checks if the file name equals "ntds.dit" 655 and proceeds to path B. Additionally, if the file name equals "unattended.xml" 656, the event proceeds to path C.

Agent detection event enrichment is checked at 625, if the confidence level 634 is greater than or equal to 70. If true, the event follows paths E and D. The event is then evaluated using logic operators at nodes 664, 663, and 665, which combine the conditions from the previous checks. Node 663 checks if conditions A and B are met, and if true, the event proceeds to additional evaluation with the true condition of path D 665, leading to terminal node 671, which indicates "sensitive file accessed by the detected process". If conditions C and D are both met, at 664, then the evaluation leads to the terminal 671 to indicate, "sensitive file accessed by the detected process".

Registry access event enrichment evaluation 626 check for specific registry keys "SECURITY\Policy\Secrets" 645. If condition F is met along with the confidence level condition E, the event proceeds to terminal node 672, resulting in Rule 2 triggering 682, representing "sensitive register accessed by the detected process."

FIG. 6B depicts how events from the persistent event stream are processed through a compiled detection logic using the Rete network algorithm. The target nodes represent the stages of event evaluation, leading to the population of the persistent event stream and the registration of engine detections and incidents, according to an embodiment.

In one embodiment, a Phreak algorithm, an evolution of the Rete network, can be used. The primary benefit of Phreak over Rete and ReteOO is that it uses lazy evaluation, as opposed to eager matching. The generated evaluation tree is much more complex and includes structures such as subnetworks, enhancing the efficiency of the threat detection process by reducing unnecessary evaluations and focusing computational resources on more promising threat indicators.

In an embodiment, the Rete network algorithm is extended to support hierarchical networks, where each node within a primary Rete network can serve as a root node for a subsequent, more specialized Rete network. A Rete network detection approach allows for modular and scalable rule processing, breaking down complex detection logic into manageable, context-specific sub-networks. Each secondary Rete network is configured for specific event types or conditions. For instance, a node handling high-risk file access events in the primary network can lead to a secondary network specialized in analyzing file operations and user behaviors. Hierarchical structure of detection engine operations reduces primary network complexity, enhances scalability, and allows for focused optimization of sub-networks. For example, a node in the primary network checking for high-risk file access can lead to a secondary network that verifies user credentials and checks for abnormal access patterns.

The invention claimed is:

1. A method for implementing, in a computing system comprising a microprocessor and memory and storage medium, an adaptive threat detection configuration, the method comprising:

configuring an endpoint detection and response (EDR) agent, under program control of the microprocessor, to collect raw event data from an endpoint, normalize the raw event data into a standardized format, and send generic events to an event router, wherein the generic events include event fields that are common to all types of collected events;

configuring the event router to receive the generic events from the EDR agent, threat detection events from a detection engine, enriched events from an event enrichment unit, and event scores from an event scoring unit, and organize received event data into a persistent event stream that includes events-in-operation;

training a baselining machine learning (ML) model to classify the events-in-operation as normal or abnormal using an event database storing historical event data and system logs, wherein a classification is an inference output comprising a normalized score of at least one of the events-in-operation characterizing a probabilistic value of event deviation from a baseline as an event-in-operation score and an event pattern including the at least one of the events-in-operation that impacts the event-in-operation score;

configuring the event enrichment unit to determine additional event fields and events of the event pattern for the event-in-operation type based on the baselining ML model, request enriched events from the EDR agent or event database, and write the enriched data to the persistent event stream;

configuring the detection engine with detection rules using a pattern matching algorithm, wherein the detection rules are based on normalized events, enriched event fields, and event scores;

wherein the pattern matching algorithm determines paths of event processing leading to threat detection;

wherein each node of a path comprises operation execution of event scoring, event enrichment, event conditions check, first time window event correlation or second time window event correlation;

wherein the event enrichment of the path is executed if the event-in-operation score exceeds a predefined threshold;

wherein engine detection operations are prioritized according to event-in-operation scores;

wherein a detection engine verdict is sent to the event router and written to the persistent event stream;

testing an adaptive threat detection system configuration and completing the configuration if the test is passed, wherein the testing comprises generating events characterizing execution of a threat from the threat collection on the endpoint and checking if all threats of the collection are registered as an incident in the detection engine; and implementing the adaptive threat detection system configuration on the computing system.

2. The method of claim 1, wherein a path node triggers a subsequent pattern matching algorithm for event-in-operation analysis.

3. The method of claim 1, further comprising adjusting the adaptive threat detection system configuration including:

retraining the baselining ML model in response to an environmental change, adjusting at least one parameter of the event scoring unit in response to the environmental change, or adjusting at least one parameter of the detection engine in response to the environmental change, wherein the environmental change includes at least one of a network topology change, an introduction of a new endpoint device, an update to threat intelligence data, an endpoint hardware or software upgrade, a change in user behavior patterns, or an active threat detection.

4. The method of claim 1, further comprising extending event fields of generic events.

5. The method of claim 1, further comprising increasing the predefined threshold.

6. The method of claim 1, further comprising changing the first time window or the second time window.

7. The method of claim 1, further comprising retraining the baselining ML model without requiring a change to the detection rules.

8. The method of claim 1, further comprising configuring serialized machine learning models trained to assess the event-in-operation score based on threat definitions to characterize the real-time security risk of the event without training on historical data.

9. The method of claim 1, further comprising configuring at least one lookup table with cached event scores, event statistics, event fields statistics, and event pattern statistics, wherein the at least one lookup table is used at the event scoring unit and event enrichment unit to retrieve the event-in-operation score and determine event data for enrichment without inferencing the baselining ML model.

10. A system for adaptive threat detection configuration for a computing system, the system comprising:

an endpoint detection and response (EDR) agent configured to collect raw event data from an endpoint, normalize the raw data into a standardized format, and send generic events to an event router, wherein the generic events include event fields that are common to all types of collected events;

at least one processor and memory operably coupled to the at least one processor;

instructions that, when executed by the at least one processor, cause the at least one processor to implement:

an event router configured to receive the generic events from the EDR agent, threat detection events from a detection engine, enriched events from an event enrichment unit, and event scores from an event scoring unit, and organize received event data into a persistent event stream that includes events-in-operation;

a baselining machine learning (ML) model trained to classify the events-in-operation as normal or abnormal using an event database storing historical event data and system logs, wherein a classification is an inference output comprising a normalized score of at least one of the events-in-operation characterizing a probabilistic value of event deviation from a baseline as an event-in-operation score and an event pattern including an event-in-operation that impacts the event-in-operation score;

the event enrichment unit configured to determine additional event fields and events of the event pattern for the event-in-operation type based on the baselining ML model, request enriched events from the EDR agent or event database, and write the enriched data to the persistent event stream;

the detection engine configured with detection rules using a pattern matching algorithm, wherein the detection rules are based on normalized events, enriched event fields, and event scores;

wherein the pattern matching algorithm determines paths of event processing leading to threat detection;

wherein each node of a path comprises operation execution of event scoring, event enrichment, event conditions check, first time window event correlation, or second time window event correlation;

wherein the event enrichment of the path is executed if the event-in-operation score exceeds a predefined threshold;

wherein engine detection operations are prioritized according to event-in-operation scores;

wherein a detection engine verdict is sent to the event router and written to the persistent event stream; and a system configuration manager configured to configure an adaptive threat detection system configuration and test the EDR agent, the event scoring unit, the event enrichment unit and the detection engine using threat collection, and complete the configuration if the test is passed, wherein testing comprises generating events characterizing execution of a threat from the threat collection on the endpoint and checking if all threats of the collection are registered as an incident in the detection engine;

wherein the adaptive threat detection system configuration is implemented on the computing system.

11. The system of claim 10, wherein a path node triggers a subsequent pattern matching algorithm for event-in-operation analysis.

12. The system of claim 10, wherein the system configuration manager is further configured to:

retrain the baselining ML model in response to an environmental change, adjust at least one parameter of the event scoring unit in response to the environmental change, or adjust at least one parameter of the detection engine in response to the environmental change wherein the environmental change includes at least one of a network topology change, an introduction of a new endpoint device, an update to threat intelligence data, an endpoint hardware or software upgrade, a change in user behavior patterns, or an active threat detection.

13. The system of claim 12, wherein the system configuration manager is further configured to, for an EDR agent, extend event fields of generic events.

14. The system of claim 12, wherein the system configuration manager is further configured to increase the predefined threshold.

15. The system of claim 12, wherein the baselining ML model retraining comprises training the baselining ML model on an updated event database.

16. The system of claim 12, wherein the system configuration manager is further configured to update the first time window or the second time window.

17. The system of claim 12, wherein the baselining ML model retraining does not require adjustment of the at least one parameter of the detection engine and the adjustment of the at least one parameter of the detection engine does not require retraining of the baselining ML model.

18. The system of claim 10, further comprising serialized machine learning models trained to assess the score of the event-in-operation based on threat definitions to characterize the real-time security risk of the event, without training on historical data.

19. The system of claim 10, further comprising lookup tables with cached event scores, event statistics, event fields statistics, and event pattern statistics, wherein the lookup tables are used at the event scoring unit and the event enrichment unit to retrieve the event-in-operation score and determine event data for enrichment without inferencing the baselining ML model.

20. A method for adaptive threat detection system configuration in a computing system, the method comprising:

configuring an endpoint detection and response (EDR) agent comprising collecting raw event data from an endpoint, normalizing the raw data into a standardized format, and sending generic events to an event router, wherein the generic events include event fields that are common to all types of collected raw events;

configuring the event router to receive the generic events from the EDR agent, threat detection events from a detection engine, enriched events from an event enrichment unit, and event scores from an event scoring unit, and organize received event data into a persistent event stream that includes events-in-operation;

training a serialized machine learning (ML) model, wherein the serialized ML model output comprises a normalized score of at least one of the events-in-operation characterizing the probabilistic value of the relationship between the at least one of the events-in-operation and a threat;

configuring the event enrichment unit to determine additional event fields necessary for event pattern matching of related threats, request enriched events from the EDR agent or event database, and write the enriched data to the persistent event stream;

configuring the detection engine with detection rules using a pattern matching algorithm, wherein the detection rules are based on normalized events, enriched event fields, and event scores;

wherein the pattern matching algorithm determines paths of event processing leading to threat detection;

wherein each node of a path comprises execution of event scoring, event enrichment, event conditions check, first time window event correlation or second time window event correlation;

wherein event enrichment of the path is executed if the event-in-operation score exceeds a predefined threshold;

testing an adaptive threat detection system configuration on threat collection, and completing the configuration if the test is passed, wherein the testing comprises generating events characterizing execution of a threat from the threat collection on the endpoint and checking if all threats of the collection are registered as an incident in the detection engine; and implementing the adaptive threat detection system configuration on the computing system.

* * * * *